(12) United States Patent
Keung et al.

(10) Patent No.: US 6,979,495 B2
(45) Date of Patent: Dec. 27, 2005

(54) MULTI-LAYER FILM WITH CORE LAYER OF SYNDIOTACTIC POLYPROPYLENE

(75) Inventors: Jay K. Keung, Victor, NY (US); Robert G. Peet, Pittsford, NY (US); Michael T. Heffelfinger, Alpharetta, GA (US)

(73) Assignee: ExxonMobil Oil Corporation, Irving, TX (US)

( * ) Notice: Subject to any disclaimer, the term of this patent is extended or adjusted under 35 U.S.C. 154(b) by 583 days.

(21) Appl. No.: 10/036,919

(22) Filed: Dec. 21, 2001

(65) Prior Publication Data

US 2002/0155308 A1 Oct. 24, 2002

Related U.S. Application Data

(63) Continuation-in-part of application No. 09/271,226, filed on Mar. 17, 1999, now abandoned.

(51) Int. Cl.[7] .................... B32B 27/08; B32B 27/18; B32B 27/32; B32B 27/34; B32B 27/36
(52) U.S. Cl. ............... 428/476.1; 428/35.7; 428/475.5; 428/475.8; 428/476.3; 428/476.9; 428/483; 428/500; 428/515; 428/516; 428/518; 428/520; 428/522; 428/523; 428/910
(58) Field of Search .......................... 428/35.7, 475.5, 428/475.8, 476.1, 476.3, 476.9, 483, 500, 515, 518, 520, 522, 523, 910, 516, 36.9, 36.91

(56) References Cited

U.S. PATENT DOCUMENTS

| | | | |
|---|---|---|---|
| 3,753,769 A | 8/1973 | Steiner | 117/122 H |
| 4,214,039 A | 7/1980 | Steiner et al. | 428/414 |
| 4,447,494 A | 5/1984 | Wagner, Jr. et al. | 428/349 |
| 4,604,324 A | 8/1986 | Nahmias et al. | 428/349 |
| 4,865,908 A | 9/1989 | Liu et al. | 428/248 |
| 4,892,851 A | 1/1990 | Ewen et al. | 502/104 |
| 4,961,992 A | 10/1990 | Balloni et al. | 428/332 |
| 5,019,447 A | 5/1991 | Keller | 428/327 |
| 5,057,177 A | 10/1991 | Balloni et al. | 156/244.11 |
| 5,155,080 A | 10/1992 | Elder et al. | 502/152 |
| 5,162,278 A | 11/1992 | Razavi | 502/152 |
| 5,254,384 A | 10/1993 | Gordon | 428/71 |
| 5,254,394 A | 10/1993 | Bothe et al. | 428/212 |
| 5,792,549 A * | 8/1998 | Wilkie | 428/215 |
| 5,981,047 A * | 11/1999 | Wilkie | 428/215 |
| 6,150,013 A * | 11/2000 | Balaji et al. | 428/220 |
| 6,391,467 B1 * | 5/2002 | DeLisio et al. | 428/516 |

FOREIGN PATENT DOCUMENTS

| | | | |
|---|---|---|---|
| EP | 0499216 B1 | | 2/1992 |
| WO | WO 99/33643 | * | 7/1999 |
| WO | WO 00/54968 | * | 9/2000 |

OTHER PUBLICATIONS

Bakker, Ed, "The Wiley Encyclopedia of Packaging Technology", pp. 514–523 (1986).

* cited by examiner

*Primary Examiner*—Vivian Chen
(74) *Attorney, Agent, or Firm*—Rick F. James

(57) ABSTRACT

The present invention is directed to a biaxially oriented multi-layer film which comprises: (a) a core layer comprising a syndiotactic propylene homopolymer; and (b) at least one additional layer adjacent to the core layer comprising a polymer which is an ethylene or a propylene homopolymer, ethylene copolymer or terpolymer containing comonomers of propylene and/or butene-1. Optionally, there can be a skin layer applied to the exposed surface of the outer layer. The skin layer and/or the at least one additional layer is a polyolefin selected from the group consisting of isotactic polypropylene, polyethylene, ethylene-propylene random copolymer, ethylene-propylene block copolymer or ethylene-propylene-butene-1 terpolymer.

15 Claims, No Drawings

MULTI-LAYER FILM WITH CORE LAYER OF SYNDIOTACTIC POLYPROPYLENE

This application claims the benefit of and is a Continuation-in-Part of regular U.S. patent application Ser. No. 09/271,226 filed Mar. 17, 1999, abandoned.

FIELD OF THE INVENTION

The present invention relates to a multi-layer thermoplastic film having a core layer of syndiotactic polypropylene.

BACKGROUND OF THE INVENTION

Oriented polypropylene films are known for use in packaging operations. U.S. Pat. No. 4,604,324 to Nahmias, et al. discloses a multi-layer polypropylene film structure comprising coextruded layers of a base layer of high stereoregularity polypropylene and a skin layer of comparatively low stereoregularity which contains anti-stick additives. In addition, the skin layer can contain up to 10 wt. % of a wax to improve heat seal characteristics or optical properties of the film. U.S. Pat. No. 5,254,394 to Bothe, et al., discloses a polyolefin film for packaging comprising a syndiotactic polypropylene base layer and a top layer of syndiotactic polypropylene which has high sealed-seam strength and excellent optical properties. The layers may contain lubricant additives such as waxes at levels of up to 2 wt %, relative to each layer.

SUMMARY OF THE INVENTION

The present invention relates to an oriented multi-layer film which comprises:
(a) a core layer comprising syndiotactic propylene polymer; and
(b) at least one additional layer adjacent to the core layer comprising an ethylene or propylene homopolymer, an ethylene copolymer, a terpolymer containing propylene, ethylene, and butene-1 as comonomers, or a blend thereof.

The polymer of the at least one additional layer can be made by any conventional method such as Ziegler-Natta catalysis or metallocene catalysis. When the at least one additional layer comprises a blend of polymers, such blend can comprise, e.g., ethylene and/or propylene homopolymers and/or one or more copolymers or terpolymers of propylene with ethylene and/or butene-1.

The present invention is further directed to a process for preparing an oriented multi-layer film which comprises the steps of
(a) melt coextruding a film comprising: (i) a core layer comprising syndiotactic polypropylene, and (ii) at least one additional layer adjacent the core layer comprising an ethylene or propylene homopolymer, an ethylene copolymer, a terpolymer containing propylene, ethylene and butene-1 as comonomers, or a blend thereof; and
(b) orienting the coextruded combination.

In several possible applications, it would be desirable to create films that have properties of the type that would be achieved by making those films from syndiotactic polypropylene. Some of these characteristics, such as the very slow development of its crystalline structure, make it impossible to make a monolayer film of syndiotactic polypropylene, however. What we have found is that the syndiotactic monolayer web extruded from a die onto a casting drum sticks very tightly to the casting drum. Because the crystalline development is very slow, the web distorts unacceptably under the low forces that are used in the accepted methods for pulling the web free from the drum.

We have determined that we can solve this problem and produce a film that can have about as much of the desired properties of a syndiotactic polypropylene film as we choose. This is accomplished by coextruding a layer of isotactic polypropylene, made either by the standard Ziegler-Natta catalyst system or by metallocene catalysts, on at least the side of the cast web that would otherwise contact the casting drum. The degree that the resulting film approximates a monolayer syndiotactic polypropylene film depends, to a large extent, on what fraction of the total structure is made up of syndiotactic polypropylene and what fraction is isotactic polypropylene, i.e., how thin or how thick a skin layer of isotactic polypropylene one chooses to use.

We have also determined that we can extend this concept so that a film with a core layer of syndiotactic polypropylene can be produced along with intermediate layers of isotactic polypropylene and outer layers of other polymeric materials providing additional characteristics, such as sealability.

DETAILED DESCRIPTION OF THE INVENTION

The core layer is made from syndiotactic polypropylene. The syndiotactic polypropylene generally possesses a syndiotacticity of at least 70% based on racemic pentads, typically greater than 75%, as measured by $C^{13}$ NMR spectroscopy. The mean length of sequence $n_r$ of the syndiotactic sequences is preferably greater than about 20, more preferably greater than about 25.

Commercially available syndiotactic propylene polymers suitable for use in the present invention include EOD 95-01 and 95-02, available from Fina Oil and Chemical Company. These materials have melt flows of about 4 and 7 g/10 min, respectively, as measured in accordance with the standard ASTM D1238 method.

The syndiotactic propylene polymer can, optionally, contain other monomeric units as in the case of a copolymer of propylene with ethylene or α-olefin having from 4 to 20 carbon atoms such as butene-1, pentene-1, hexene-1, heptene-1 or 4-methylpentene-1. Typically, the amount of monomer other than propylene is no more than 10% by weight of the entire polymer.

Propylene polymers having a syndiotactic structure are described in U.S. Pat. Nos. 5,254,394; 5,254,384; 5,162,278; 5,155,080; 4,892,851 and European Patent No. 0499216, all of which are incorporated herein by reference.

The propylene polymer is usually predominantly comprised of propylene (at least 90% by weight) and has a melting point of about 140° C. or higher, more typically a melting point of 150° C. or higher. The melt flow rate usually ranges from about 0.5 g/10 min to about 15 g/10 min at 230° C., more typically about 1.5 g/10 min to about 4 g/10 min at 230° C. The melt flow rate is measured according to the standard procedure set forth in ASTM D1238.

The at least one additional layer of the present invention may be any one of the coextrudable, biaxially orientable film-forming resins known in the art. Such materials include, but are not limited to, isotactic polypropylene, other syndiotactic polypropylenes, ethylene copolymers and terpolymers which include other monomers such as propylene and/or butene-1. Typical copolymers are ethylene-propylene copolymers, ethylene-butene-1 copolymers, butene-1-propylene random copolymers, and ethylene-propylene block copolymers. Typical terpolymers are ethylenepropylene-butene-1 terpolymers. Alternative and useful thermoplastic materials for the at least one additional layer include, but are not limited to nylon, polyester, ethylene-vinyl acetate copolymer, and ethylene-vinyl alcohol copolymer. Blends of any of the foregoing homopolymers, copolymers and terpolymers are contemplated.

Ethylene-propylene-butene-1 random terpolymers appropriate for use in the at least one additional layer of the present invention include those containing 1–5 weight percent random ethylene and 10–25 weight percent random butene-1, with the balance being made up of propylene. The amounts of the random ethylene and butene-1 components in these terpolymers are typically in the range of 10 to 25 weight percent (ethylene plus butene-1) based on the total amount of the copolymer.

The copolymers and terpolymers typically have a melt flow rate in the range of about 5 to 10 g/10 min, with a density of about 0.9 and a melting point in the range of about 115 to about 130° C.

The polymers of the outermost layers of the film can also be fabricated from any polymers, copolymers or terpolymers or blends of homopolymers and blends of copolymer(s) and homopolymer(s) which have heat seal properties. Several of the materials identified above are illustrative of heat sealable copolymers which can be used in the present invention.

In one aspect of the invention the at least one additional layer is derived from polyethylene. The polyethylene can be low density polyethylene (LDPE), linear low density polyethylene (LLDPE), medium density polyethylene (MDPE) or high density polyethylene (HDPE). These ethylene polymers typically have a melt index ranging from about 0.3 to about 15 g/10 min, as measured in accordance with the standards of ASTM D1238. The low density polyethylenes should have a density of about 0.88 to about 0.93 g/cm$^3$. Linear materials may have a density as high as 0.94 g/cm$^3$, often ranging from 0.90 to 0.94 g/cm$^3$, with a melt index of about 1 to about 10. The linear low density polyethylenes may be derived from ethylene together with other higher comonomers such as butene-1, hexene-1, or octene-1. Typically it is useful to use HDPE as the at least one additional layer as it enhances film toughness. HDPE has a density of greater than about 0.941 g/cm$^3$, typically from about 0.941 to about 0.965 g/cm$^3$. High density polyethylene suitable for use as the at least one additional layer is described in Bakker, Ed. "The Wiley Encyclopedia of Packaging Technology, pp. 514 to 523 (1986).

Each of the at least one additional layer can range in thickness from about 0.01 mil to about 0.20 mil, specifically from about 0.02 mil to about 0.06 mil.

There can be more than one layer coextruded on each side of the core. That is, one or more layers, selected from the materials defined for the at least one additional layer, can be added to one or both surfaces of the core layer. Films having such a multi-layer structure are represented, in simplified form, as having a structure "ABCDE" where "C" represents a core layer, "B" represents an outer layer adjacent to the core layer and "A" represents a further outer layer or skin layer applied to the outer surface of outer layer "B." In such a film structure, the outer layer "B" can be referred to as a "tie-layer" or an "intermediate layer." Layers "A" and "B" may be the same or different. Similarly, "D" and "E" represent additional layers on the other side of the core layer. Layers "B" and "D" may be the same or different, and layers "D" and "E" may be the same or different. A layer may also be absent. Additionally, structures containing more than five layers are contemplated, e.g., six, seven, eight, nine, and more layers are contemplated.

In order to modify or enhance certain properties of the multi-layer films of the invention for specific end-uses, it is possible for one or more of the layers to contain appropriate additives in effective amounts. Preferred additives include antistatic agents, antiblocking agents, lubricants, stabilizers and/or one or more of a class of hydrocarbons resins, such as alicyclic hydrocarbon resins which are known to improve barrier properties. Such additives are further described in U.S. Pat. No. 5,254,394, which is incorporated herein by reference. It is useful to incorporate additives such as wax, finely divided inorganic antiblock particles, silicone oil, and silicone spheres such as non-migratory particulate crosslinked hydrocarbyl substituted polysiloxane slip agent, such as TOSPEARL which is marketed world-wide by Toshiba Silicone Co., Ltd. and in the United States by General Electric. The alicyclic hydrocarbons include polyterpenes, petroleum resins, and "hard" resins employed in the films to improve barrier properties and sealability. Examples of these materials would include PICCOLYTE and REGALREZ from Hercules, ZONTEC from Arizona Chemical Company, ARKON from Arakawa Chemical Co., and ESCOREZ from Exxon. Other additives that can be incorporated into one or more layers of the film include nucleators, such as MILLAD 3938 from Milliken for modifying the crystalline structure, and carbon black for brightening.

Finely divided inorganic antiblock materials, comprehended above, include, Syloid, a synthetic amorphous silica gel, having a composition of 99.7% $SiO_2$; diatomaceous earth having a composition of, for example, $SiO_2$ 92%, $Al_2O_3$ 3.3%, $Fe_2O_3$ 1.2%, which can be obtained in various grades with average particle sizes ranging from about 0.5 microns to about 7–10 microns, which particles are porous and irregularly shaped; dehydrated kaolin clays, such as Kaopolite SF which has the composition $SiO_2$ 55%, $Al_2O_3$ 44%, $Fe_2O_3$ 0.4% which has an average particle size of about 0.7 microns, and whose particles are thin flat platelets; and synthetic precipitated silicates, Sipernat 44, for example, having a composition of $SiO_2$ 42%, $Al_2O_3$ 36%, $Na_2O$ 22%, which has an average particle size of about 3–4 microns, which particles are porous and irregularly shaped. The amount of antiblock typically ranges from about 0.002 to about 0.5 weight % based upon the weight of the polymer.

Typically, a commercially available intensive mixer, such as those of the Bolling- or Banbury-type can be employed in mixing a concentrate of the finely divided inorganic material and the selected polymer until there is a uniform dispersion of the inorganic material in the polymer.

The alicyclic hydrocarbon is advantageously used to improve the barrier properties of the film. It has also been found that the alicyclic hydrocarbon contributes to film stiffness: the stiffness of the film increases as the amount of alicyclic hydrocarbon increases. The amount of alicyclic hydrocarbon employed in a layer of the film typically ranges from about 3 to about 15 wt. % based upon the weight of the layer.

One or more of the exposed layers of the multi-layer films of the present invention can be surface-treated to render the films receptive to printing inks, adhesives and/or coatings. The surface treatment can be carried out by any method known in the art such as corona discharge treatment or flame treatment.

Optionally a coating may be applied to one or both of the exposed surface(s) of the outermost layer(s) of the film. Prior to application of the coating material, the film may be surface treated or may be primed with a primer layer.

Appropriate coatings contemplated include acrylic coatings such as those described in U.S. Pat. Nos. 3,753,769 and 4,865,908, PVDC coatings such as those described in U.S. Pat. Nos. 4,214,039; 4,447,494; 4,961,992; 5,019,447 and 5,057,177, all of which are incorporated herein by reference. A vinyl alcohol polymer, such as VINOL 325, may also be used as a coating composition.

Appropriate primer materials are poly(ethyleneimine), epoxy primer, and the like.

The outer surface of the film is preferably treated to increase its surface energy and therefor insure that the coating layer will be strongly adherent thereto, thereby reducing the possibility of the coating peeling or being stripped from the film. In addition to corona discharge and flame treatment, this treatment can be accomplished employing other known techniques, such as, for example, film chlorination, i.e., exposure of the film surface to aqueous chlorine, treatment with oxidizing agents such as chromic acid, hot air, or steam treatment, and the like. Although any of these techniques are effectively employed to pretreat the film surface, a particularly desirable method of treatment is the so-called electronic treatment method which comprises exposing the film surface to a high voltage corona discharge while passing the film between a pair of spaced electrodes. After electronic treatment of the film surface, the coating composition is then applied thereto.

The exposed, treated or untreated surface(s), e.g., the surface(s) of layer(s) A and/or E, may have applied to it/them coating compositions, as mentioned above, and/or substrates such as another polymer film or laminate; a metal foil such as aluminum foil; cellulosic webs, e.g. numerous varieties of paper such as corrugated paperboard, craft paper, glassines, cartonboard; nonwoven tissue, e.g., spunbonded polyolefin fiber, melt-blown microfibers, etc. The application may employ a suitable adhesive, e.g., a hot melt adhesive such as low density polyethylene, ethylene-methacrylate copolymer, water-based adhesive such as polyvinylidene chloride latex, and the like.

The extruded film can be stretched in the machine direction, coated with the coating composition and then stretched perpendicularly in the transverse direction. In yet another embodiment, the coating can be carried out after biaxial orientation is completed.

The coating composition should be applied in such amount that there will be deposited upon drying a smooth, evenly distributed layer, generally on the order of from about 0.01 to about 0.2 mil thickness (equivalent to about 0.2 to 3.5 g per 1000 sq. in. of film). In general, the thickness of the applied coating is such that it is sufficient to impart the desired seal sealability and/or oxygen and/or water vapor barrier characteristics to the resulting film. Generally, the coating comprises 1 to 25 wt %, preferably 7 to 15 wt % of the entire coated film composition. The coating on the film is subsequently dried by hot air, radiant heat or by any other convenient means.

There are many advantages to the film of the invention. However, most notable is the advantageous barrier properties which permit the film to be adapted to controlled atmosphere packaging. Additionally, the film has remarkable toughness and resistance to deformation but it also can be made with a soft, "drapy" feel which would be useful as a protective cover for clothing such as dry-cleaning bags.

Usually the film of the invention has a total thickness ranging from about 0.4 mil to about 2.5 mils, specifically from about 0.5 mil to about 2.0 mils. The thickness relationship of the layers can be important. In particular, the core layer is a relatively thick layer which constitutes about 40 to about 95% of the total film thickness, an intermediate or tie layer may be of a thickness ranging from about 0 to about 50% of the total film thickness, while an outer skin layer may range from about 1 to about 15% of the total film thickness.

It is preferred that all layers of the multi-layer film structures of the present invention be coextruded. Thereafter, the film may be biaxially oriented.

The polymers are brought to the molten state and coextruded from a conventional extruder through a flat sheet die, the melt streams are combined in an adapter prior to being extruded from the die or within the die. After leaving the die, the multi-layer film is chilled and the quenched sheet is reheated and oriented.

The film is oriented by biaxially stretching the film. The film can be oriented by stretching from about 3.5 to about 6.5 times in the machine direction (MD) at temperatures ranging from about 110° C. to about 150° C., and from about 5 to about 14 times in the transverse direction (TD) at temperatures ranging from about 152° C. to about 165° C.

In each of the examples, the film was oriented about 4.5–6 times in the MD at a temperature of about 125–135° C. and about 8–9 times in the TD at a temperature of about 155–160° C. Multi-layer films were prepared employing commercially available systems for coextrusion.

The properties of the films were determined according to the following methods:

A. Tensile Properties:

| | |
|---|---|
| 1. Modulus (psi) | ASTM D882 |
| 2. Elongation at Break (%) | ASTM D882 |
| 3. Tensile Strength (psi) | ASTM D882 |
| B. Dimensional Stability (% change): | ASTM D1204 |

All shrinkage values to determine dimensional stability were measured at 275° F./135° C.

C. Optics:

| | |
|---|---|
| 1. Haze (% light transmitted) | ASTM D1003 |
| 2. Gloss (% light reflected at about a 45° angle) | ASTM D2457 |
| D. WVTR (g/100 in$^2$/day): | ASTM F1249 |
| E. TO$_2$ (g/100 in$^2$/day): | ASTM D3985 |
| F. Tear Strength (g/mil): | ASTM D1922 |
| G. Coefficient of Friction (COF): | ASTM D1894 |
| H. Puncture Resistance (g/mil): | Standard Mobil PR Test |

EXAMPLE 1

In Example 1, a five layer film was made having a core layer of syndiotactic polypropylene having a melt flow rate of about 7, tie layers of conventional isotactic polypropylene (Fina 3371) and a skin layer of ethylene-propylene-butene-1 terpolymer was applied to each outer surface of the tie layer. The core layer was 50% of the total film structure, the tie layers were 40% of the total film structure and the skin layers were 10% of the total film structure. The unoriented film measured 50–56 mils. The biaxially oriented film, oriented by conventional sequential biaxially orienting apparatus, measured about 1 mil in thickness.

The syndiotactic polypropylene was melted in an extruder to provide the core layer. A second and a third extruder, in association with the first extruder, were supplied with the isotactic polypropylene; these extruders provided the tie-layers. A fourth extruder, in association with the first three extruders, was supplied with ethylene-propylene-butene-1 terpolymer. A melt coextrusion was carried out maintaining the extruder at a temperature sufficient to maintain all polymers in the molten state (about 240° C. to about 270°

C.). The polymer extruded as the tie layers was maintained at about the same temperature as the polymer used in making the core layer, as was the terpolymer of the skin layers. The terpolymer of the fourth extruder was split into two streams to enable formation of skin layers on each surface of the tie layer.

EXAMPLE 2

In Example 2, a five layer film was made, following the procedure of Example 1, having a core layer of syndiotactic polypropylene, melt flow rate of about 7, tie layers of conventional isotactic polypropylene (Fina 3371) and skin layers of metallocene catalyzed polyethylene (Exxon product designated as Exxon 3016) located on each exposed surface of the tie layers. The core layer was 50% of the total film thickness, the tie layers were 40% of the total film thickness and the skin layers were 10% of the total film thickness. The entire film was 1 mil.

The properties of the films of Examples 1 and 2 are reported in Table 1.

EXAMPLE 4

In Example 4, a five layer film was made following the procedure of Example 1 having a core layer of syndiotactic polypropylene, melt flow rate of about 3, tie layers of conventional isotactic polypropylene (Fina 3371) and a skin layer on each side of the tie layer, which skin layers were metallocene catalyzed polyethylene commercially available from Exxon under the product designation 3016. This metallocene catalyzed polyethylene had a density of 0.910 and a melt index of 4.5. The skin layers each contained 2300 ppm silica antiblock (0.23 wt. % based on the weight the skin layer). The silica antiblock additive was a commercial material sold under the product designation SYLOBLOC 42 by W. R. Grace & Co. The core layer was 50% of the total film structure and the tie layers were 40% of the total film structure while the skin layers were 10% of the total film structure. The entire film was 1 mil thick.

TABLE 1

| | Tensile Properties | | | | | | | | | | | | | | Water | | | |
| --- | --- | --- | --- | --- | --- | --- | --- | --- | --- | --- | --- | --- | --- | --- | --- | --- | --- | --- |
| | Modulus | | Elongation | | Ultimate Tensile | | Dimensional Stability | | Coefficient of Friction | | | Optics | | Vapor Trans. | Tear Strength | | Puncture |
| EX. | MD | TD | MD | TD | MD | TD | MD | TD | I/I | O/O | I/O | Haze | Gloss | Rate | MD | TD | Resistance |
| 1 | 178 | 327 | 147 | 49 | 8.9 | 18.9 | −6.9 | −7.7 | 0.81 | 0.83 | 0.85 | 2.3 | 86.7 | 0.52 | 14.4 | 1.9 | 1531 |
| 2 | 150 | 283 | 172 | 47 | 9.2 | 16.7 | −7.4 | −7.9 | 0.37 | 0.58 | 0.45 | 3.1 | 90.7 | 0.52 | 12.8 | 4.2 | 1301 |

Note:
"I/I," "O/O," and "I/O" designate "inside to inside," "outside to outside," and "inside to outside" of the films, respectively.

EXAMPLE 3

In Example 3, five layer films were made by the process described in Example 1 having a core layer of syndiotactic polypropylene, melt flow rate of about 3. To the core layer was added 0, 3, 9, and 15 wt. %, based upon the weight of the core layer, of an alicyclic hydrocarbon, ARKON P115 from Arakawa Chemical Co. Tie layers of conventional isotactic polypropylene (Fina 3371) were coextruded on each side of the core layer and a skin layer of ethylene-propylene-butene-1 terpolymer was applied to each exposed surface of the tie layers. The core layer was 38% of the total film thickness, the tie layers were 52% of the total film thickness and the skin layers were 10% of the total film thickness. The entire film was about 1 mil in thickness. The properties of the films of this example are reported in Table 2.

EXAMPLE 5

Example 5 is substantially the same as Example 4, except that the skin layers were metallocene catalyzed polyethylene commercially available from Exxon under the product designation Exxon 3027. This metallocene catalyzed polyethylene had a density of 0.908 and a melt index of 3.5.

EXAMPLE 6

Example 6 is substantially the same as Example 4, except that the core layer propylene polymer had a melt flow of 7, and the skin layers were metallocene catalyzed polyethylene commercially available from Exxon under the product designation Exxon 3034. This metallocene catalyzed polyethylene had a density of 0.902 and a melt index of 3.5.

The properties of each film of Examples 4, 5 and 6 are reported in Table 3.

TABLE 2

| | Tensile Properties | | | | | | | | | | | | | | | | |
| --- | --- | --- | --- | --- | --- | --- | --- | --- | --- | --- | --- | --- | --- | --- | --- | --- | --- |
| | Modulus | | Elongation | | Ultimate Tensile | | Dimensional Stability | | Coefficient of Friction | | Optics | | Barrier | | Tear Strength | | Puncture |
| % P115 | MD | TD | MD | TD | MD | TD | MD | TD | I/I | I/O | Haze | Gloss | WVTR | TO$_2$ | MD | TD | Resistance |
| 0 | 170 | 331 | 159 | 39 | 9.0 | 19.8 | −5.0 | −6.5 | 0.79 | 0.82 | 2.3 | 85.6 | 0.56 | 135.8 | 14.5 | 2.8 | 1550 |
| 3 | 186 | 356 | 152 | 46 | 9.3 | 20.9 | −3.5 | −6.4 | 0.76 | 0.85 | 2.7 | 85.3 | 0.52 | 132.9 | 14.2 | 2.4 | 1694 |
| 9 | 222 | 405 | 182 | 50 | 12.2 | 22.1 | −5.0 | −6.0 | 0.72 | 0.79 | 2.8 | 84.7 | 0.45 | 113.8 | 6.7 | 1.2 | 1920 |
| 15 | 244 | 441 | 172 | 43 | 12.3 | 22.4 | −5.7 | −8.4 | 0.80 | 0.90 | 2.9 | 86.5 | 0.40 | 105.7 | 5.6 | 1.9 | 2053 |

TABLE 3

| | Tensile Properties | | | | | | Dimensional Stability | | Coefficient of Friction | | | Optics | | Water Vapor Trans. | Tear Strength | | Puncture | |
| | Modulus | | Elongation | | Ultimate Tensile | | | | | | | | | Rate | | | | |
| EX. | MD | TD | MD | TD | MD | TD | MD | TD | I/I | O/O | I/O | Haze | Gloss | | MD | TD | Resistance | TO$_2$ |
|---|---|---|---|---|---|---|---|---|---|---|---|---|---|---|---|---|---|---|
| 4 | 143 | 227 | 146 | 42 | 8.9 | 11.6 | −5.0 | −13.9 | 0.49 | 0.47 | 0.47 | 2.5 | 85.8 | 0.59 | 13.5 | 5.6 | 1191 | 155 |
| 5 | 148 | 227 | 140 | 59 | 9.2 | 12.1 | −4.7 | −14.2 | 0.55 | 0.54 | 0.57 | 1.7 | 90.8 | 0.6 | 12.3 | 4.9 | 1314 | 145 |
| 6 | 167 | 273 | 131 | 39 | 9.5 | 13.6 | −4.7 | −13.2 | 0.55 | 0.55 | 0.55 | 1.5 | 92.2 | 0.58 | 11.3 | 4.2 | 1100 | 173 |

EXAMPLE 7

In Example 7, a three layer film was made having a core layer of syndiotactic polypropylene, melt flow rate of about 3, and outer layers made from conventional isotactic polypropylene (Fina 3371). The core layer was 50% of the total film structure while the skin layers were 50% of the total film structure. The film of this example was made by the process described in Example 1, except the fourth extruder was omitted. The entire film was about 1 mil thick.

The properties of this film are reported in Table 4.

TABLE 4

| | Tensile Properties | | | | | | Dimensional Stability | | Optics | | | Puncture |
| | Modulus | | Elongation | | Ultimate Tensile | | | | | | | |
| Ex. | MD | TD | MD | TD | MD | TD | MD | TD | Haze | Gloss | WVTR | Resistance |
|---|---|---|---|---|---|---|---|---|---|---|---|---|
| 7 | 187 | 321 | 139 | 48 | 10.8 | 16.9 | −5.9 | −15.9 | 0.9 | 91.5 | 0.53 | 1948 |

What is claimed is:

1. A biaxially oriented multi-layer film oriented in a transverse direction and a machine direction comprising:
   (a) a core layer comprising at least about 90 wt % of a syndiotactic polypropylene polymer;
   (b) at least one additional layer adjacent to the core layer comprising a material selected from the group consisting of butene-1-propylene random copolymer, ethylene-propylene block copolymer, nylon, polyester, ethylene-vinyl acetate copolymer, ethylene-vinyl alcohol copolymer, ethylene-propylene-butene-1 random terpolymer containing 1 to 5 wt. % random ethylene and 10 to 25 wt. % random butene-1, low density polyethylene, linear low density polyethylene, medium density polyethylene, high density polyethylene, and blends thereof; and
   (c) wherein the film has a modulus measured in the transverse direction and a modulus measured in the machine direction and the ratio of the modulus in the transverse direction to the modulus in the machine direction is from about 1.53 to about 1.95.

2. The biaxially oriented multi-layer film of claim 1 further comprising a skin layer adjacent to at least one additional layer wherein the skin layer comprises a polyolefin.

3. The biaxially oriented multi-layer film of claim 2 having an elongation to break measured in the machine direction and an elongation to break measured in the transverse direction and the ratio of the elongation to break in the machine direction to the elongation to break in the transverse direction is from about 2.4 to about 4.1.

4. The biaxially oriented multi-layer film of claim 3 wherein the skin layer is a polyolefin selected from the group consisting of isotactic polypropylene, ethylene-propylene random copolymer, ethylene-propylene block copolymer, ethylene-propylene-butene-1 terpolymer, and blends thereof.

5. The biaxially oriented multi-layer film of claim 4 comprising a second layer adjacent to the core layer comprising a material selected from the group consisting of butene-1-propylene random copolymer, ethylene-propylene block copolymer, nylon, polyester, ethylene-vinyl acetate copolymer, ethylene-vinyl alcohol copolymer, ethylene-propylene-butene-1 random terpolymer containing 1 to 5 wt. % random ethylene and 10 to 25 wt. % random butene-1, low density polyethylene, linear low density polyethylene, medium density polyethylene, high density polyethylene, and blends thereof.

6. The biaxially oriented multi-layer film of claim 5 having an ultimate tensile strength measured in the transverse direction and an ultimate tensile strength measured in the machine direction and the ratio of the ultimate tensile strength measured in the transverse direction to the ultimate tensile strength in the machine direction is from about 1.3 to about 2.2.

7. The biaxially oriented multi-layer film of claim 2 having a coating comprising a material selected from the group consisting of polyvinylidene chloride, a polyvinyl alcohol, an acrylic polymer, and blends thereof.

8. The biaxially oriented multi-layer film of claim 2 wherein the at least one additional layer comprises silica particles.

9. The biaxially oriented multi-layer film of claim 2 comprising an alicyclic hydrocarbon.

10. A biaxially oriented multi-layer film which comprises:
   (a) a core layer comprising a syndiotactic propylene polymer;
   (b) a first outer layer adjacent to a first side of the core layer wherein the first outer layer comprises a material selected from the group consisting of butene-1-propylene random copolymer, ethylene-propylene block copolymer, nylon, polyester, ethylene-vinyl acetate copolymer, ethylene-vinyl alcohol copolymer, ethylene-propylene-butene-1 random terpolymer containing 1 to 5 wt. % random ethylene and 10 to 25 wt. % random butene-1, low density polyethylene, linear low density polyethylene, medium density polyethylene, high density polyethylene, and blends thereof;

(c) a second outer layer applied to an outer surface of the first outer layer, wherein the second outer layer comprises a material selected from the group consisting of butene-1-propylene random copolymer, ethylene-propylene block copolymer, nylon, polyester, ethylene-vinyl acetate copolymer, ethylene-vinyl alcohol copolymer, ethylene-propylene-butene-1 random terpolymer containing 1 to 5 wt. % random ethylene and 10 to 25 wt. % random butene-1, low density polyethylene, linear low density polyethylene, medium density polyethylene, high density polyethylene, and blends thereof;

(d) a third outer layer adjacent to a second side of the core layer, wherein the third outer layer comprises a material selected from the group consisting of butene-1-propylene random copolymer, ethylene-propylene block copolymer, nylon, polyester, ethylene-vinyl acetate copolymer, ethylene-vinyl alcohol copolymer, ethylene-propylene-butene-1 random terpolymer containing 1 to 5 wt. % random ethylene and 10 to 25 wt. % random butene-1, low density polyethylene, linear low density polyethylene, medium density polyethylene, high density polyethylene, and blends thereof;

(e) a fourth outer layer applied to an outer surface of the third outer layer, wherein the fourth outer layer comprises a material selected from the group consisting of butene-1-propylene random copolymer, ethylene-propylene block copolymer, nylon, polyester, ethylene-vinyl acetate copolymer, ethylene-vinyl alcohol copolymer, ethylene-propylene-butene-1 random terpolymer containing 1 to 5 wt. % random ethylene and 10 to 25 wt. % random butene-1, low density polyethylene, linear low density polyethylene, medium density polyethylene, high density polyethylene, and blends thereof; and (f) wherein the film has a modulus measured in the transverse direction and a modulus measured in the machine direction and the ratio of the modulus in the transverse direction to the modulus in the machine direction is from about 1.53 to about 1.95.

11. The biaxially oriented multi-layer film of claim 10 having an elongation to break measured in the machine direction and an elongation to break measured in the transverse direction and the ratio of the elongation to break in the machine direction to the elongation to break in the transverse direction is from about 2.4 to about 4.1.

12. The biaxially oriented multi-layer film of claim 11 having an ultimate tensile strength measured in the transverse direction and an ultimate tensile strength measured in the machine direction and the ratio of the ultimate tensile strength measured in the transverse direction to the ultimate tensile strength in the machine direction is from about 1.3 to about 2.2.

13. A process for preparing a biaxially oriented multi-layer film comprising the steps of:

(a) melt coextruding a film comprising: (i) a core layer comprising at least about 90 wt. % of a syndiotactic polypropylene, (ii) a first additional layer adjacent to a first side of the core layer comprising materials selected from the group consisting of butene-1-propylene random copolymer, ethylene-propylene block copolymer, nylon, polyester, ethylene-vinyl acetate copolymer, ethylene-vinyl alcohol copolymer, ethylene-propylene-butene-1 random terpolymer containing 1 to 5 wt. % random ethylene and 10 to 25 wt. % random butene-1, low density polyethylene, linear low density polyethylene, medium density polyethylene, high density polyethylene, and blends thereof, and (iii) a second additional layer adjacent to a second side of the core layer comprising materials selected from the group consisting of butene-1-propylene random copolymer, ethylene-propylene block copolymer, nylon, polyester, ethylene-vinyl acetate copolymer, ethylene-vinyl alcohol copolymer, ethylene-propylene-butene-1 random terpolymer containing 1 to 5 wt. % random ethylene and 10 to 25 wt. % random butene-1, low density polyethylene, linear low density polyethylene, medium density polyethylene, high density polyethylene, and blends thereof, and (b) biaxially orienting the coextruded combination in a machine and a transverse direction to form a film having a modulus measured in the transverse direction and a modulus measured in the machine direction and the ratio of the modulus in the transverse direction to the modulus in the machine direction is from about 1.53 to about 1.95.

14. The process for preparing the biaxially oriented multi-layer film of claim 13 wherein the oriented multi-layer film has an elongation to break measured in the machine direction and an elongation to break measured in the transverse direction and the ratio of the elongation to break in the machine direction to the elongation to break in the transverse direction is from about 2.4 to about 4.1.

15. The process for preparing the biaxially oriented multi-layer film of claim 14 wherein the film has an ultimate tensile strength measured in the transverse direction and an ultimate tensile strength measured in the machine direction and the ratio of the ultimate tensile strength measured in the transverse direction to the ultimate tensile strength in the machine direction is from about 1.3 to about 2.2.

* * * * *